(12) United States Patent
Lin

(10) Patent No.: US 9,287,769 B1
(45) Date of Patent: Mar. 15, 2016

(54) SYNCHRONIZING CIRCUITRY FOR AC-DC SWITCH MODE POWER SUPPLIES

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONIC CO., LTD., Taichung (TW)

(*) Notice: Subject to any disclaimer, the term of this patent is extended or adjusted under 35 U.S.C. 154(b) by 52 days.

(21) Appl. No.: 14/499,447

(22) Filed: Sep. 29, 2014

(51) Int. Cl.
 *H02M 1/44* (2007.01)

(52) U.S. Cl.
 CPC .................................... *H02M 1/44* (2013.01)

(58) Field of Classification Search
 CPC ............................................. H02M 2001/0077
 USPC ........................................ 363/74, 78, 79, 72
 See application file for complete search history.

(56) References Cited

U.S. PATENT DOCUMENTS

| | | | | |
|---|---|---|---|---|
| 2002/0097589 A1* | 7/2002 | Jansen | ............... | H02M 3/33592 363/21.14 |
| 2003/0090914 A1* | 5/2003 | Jansen | ............... | H02M 3/33576 363/21.12 |
| 2006/0083039 A1* | 4/2006 | Oliveira | ............... | H02M 7/493 363/131 |
| 2006/0279969 A1* | 12/2006 | Leung | ............... | H02M 3/33515 363/41 |
| 2007/0076453 A1* | 4/2007 | Schultz | ............... | H02J 1/102 363/72 |
| 2015/0349534 A1* | 12/2015 | Lin | ............... | H02J 4/00 307/75 |
| 2015/0381076 A1* | 12/2015 | Sadki | ............... | H02M 7/797 363/132 |

* cited by examiner

*Primary Examiner* — Matthew Nguyen
*Assistant Examiner* — Kyle J Moody
(74) *Attorney, Agent, or Firm* — Ming Chow; Sinorica, LLC

(57) ABSTRACT

A synchronizing circuitry for AC-DC switch mode power supplies includes a master control circuit connected to one or more slave control circuits through one or more communication interfaces. With the communication interfaces, the master control circuit and the slave control circuits can be connected using existing communication loops, so that when the master control circuit performs master-slave control on the slave control circuits, the slave control circuits have synchronous connection with the master control circuit, thereby mitigating electromagnetic interference that may happen during master-slave control, and effectively reducing noise. As a result, signal transmission is more efficient and master-slave control is more responsive.

6 Claims, 2 Drawing Sheets

SYNCHRONIZING CIRCUITRY FOR AC-DC SWITCH MODE POWER SUPPLIES

BACKGROUND OF THE INVENTION

1. Technical Field

The present invention relates to AC-DC power supplies, and more particularly to a synchronizing circuitry for AC-DC switch mode power supplies.

2. Description of Related Art

Conventionally, an electronic device may have some peripherals interacting and working with it as an assembled system opposite to an integrated apparatus. In this case, the electronic device and its peripherals are powered by their respective power supplies. In a known AC-DC switch mode power supply, there is typically a controller performing pulse width modulation, so as to drive the power supply selectively to output a full-wave rectified DC voltage which may further be converted into a sine-wave AC voltage. However, when such AC-DC switch mode power supplies work in a system of individual yet connected units, the asynchronism among the voltages output by the power supplies can significantly slow down the response of the system, and even incur additional problems such as electromagnetic interference and noise.

In view of this, the inventor of the present invention recognizes that the existing AC-DC switch mode power supplies having such shortcomings need to be further improved and proposes this invention.

SUMMARY OF THE INVENTION

The primary objective of the present invention is to provide a synchronizing circuitry for AC-DC switch mode power supplies, which uses existing communication loops to connect a master device and one or more slaves for their synchronous response, thereby mitigating electromagnetic interference, reducing noise, and improving response, so as to ensure instant response of the master and the slaves during master-slave control.

For achieving the foregoing objective, the disclosed synchronizing circuitry comprises a master control circuit that has a first controller, which is connected to a first selector switch that is further connected to a first connecting port and a second connecting port; a plurality of slave control circuits that include a first slave control circuit and a second slave control circuit, wherein the slave control circuit is provided with a second controller that is connected to a second selector switch that is further connected to a third connecting port and a fourth connecting port; and a plurality of communication interfaces that include a first communication interface and a second communication interface, wherein the first communication interface spans between the first connecting port of the master control circuit and a fourth connecting port of the first slave control circuit, while the second communication interface spans between the third connecting port of the first slave control circuit and the fourth connecting port of the second slave control circuit, so as to connect the first slave control circuit and the second slave control circuit.

The disclosed synchronizing circuitry uses the communication interfaces, uses existing communication loop communication loops to connect the master control circuit and the slave control circuits, so that when the master performs master-slave control on the slaves, the slaves have synchronous connection with the master, thereby significantly mitigating electromagnetic interference and noise during master-slave control, making signal transmission during master-slave control more efficient, and improving the response of master-slave control.

DETAILED DESCRIPTION OF THE INVENTION

Figure 1:
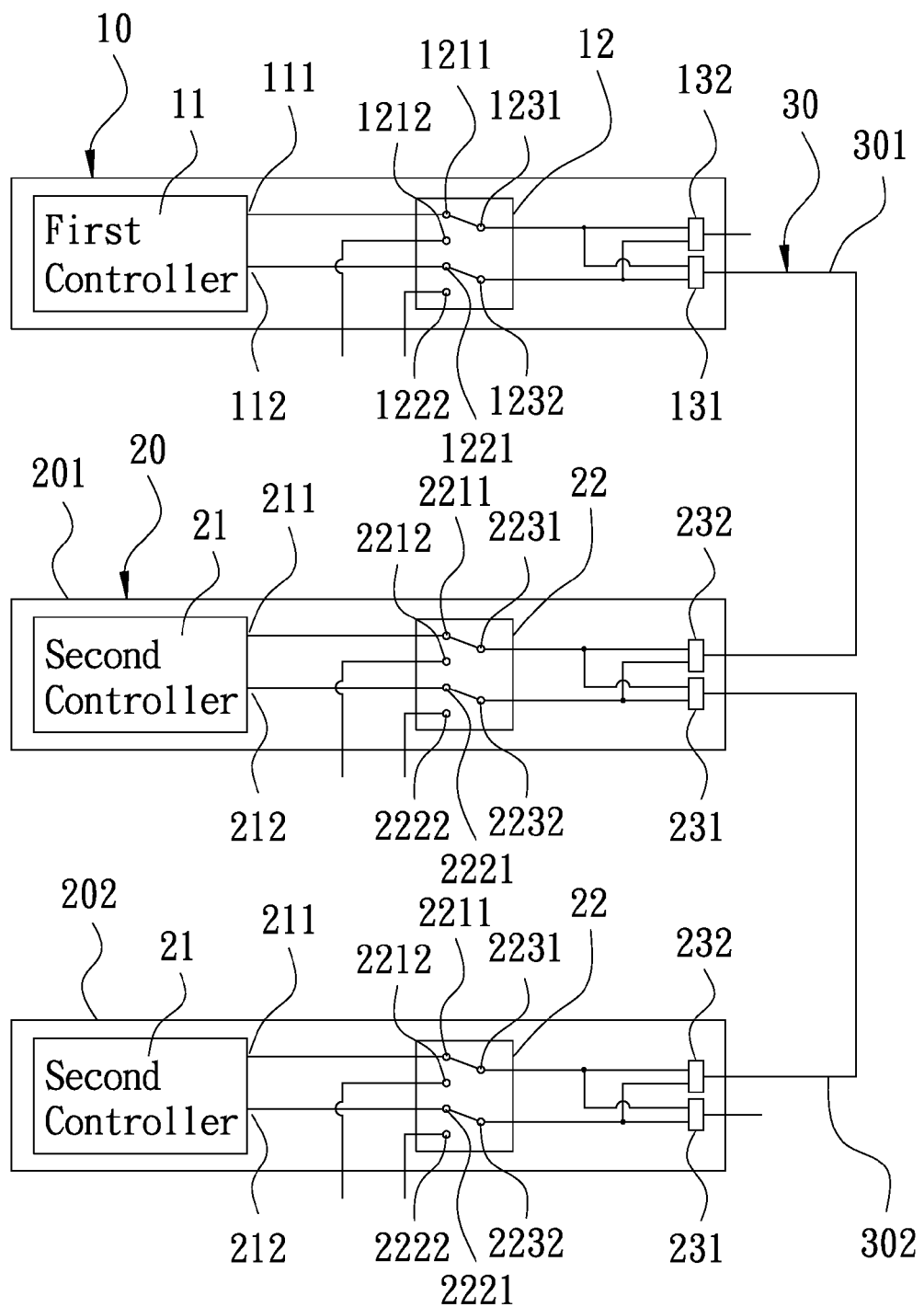
FIG. 1 is a block diagram illustrating a synchronizing circuitry of the present invention performing synchronous control among AC-DC switch mode power supplies.

Please refer to FIG. 1 for a block diagram according to one embodiment of the present invention showing a synchronizing circuitry for AC-DC switch mode power supplies. As shown, the synchronizing circuitry comprises a master control circuit 10, two slave control circuits 20 and two communication interfaces 30.

The master control circuit 10 has a first controller 11. In the present embodiment, the first controller 11 is a pulse width modulation (PWM) controller configured to perform synchronous control to the switching frequencies of multiple AC-DC switch mode power supplies. The first controller 11 further has a first transmitting end 111 and a first receiving end 112. The first transmitting end 111 and the first receiving end 112 are respectively connected to a first selector switch 12. The first selector switch 12 has a second transmitting end 1231 and a second receiving end 1232. The first selector switch 12 further has a first synchronizing end 1211, a second synchronizing end 1221, a first communicating end 1212, and a second communicating end 1222. Therein, the second transmitting end 1231 is selectively connected to either the first synchronizing end 1211 or the first communicating end 1212, and the second receiving end 1232 is selectively connected to either the second synchronizing end 1221 or the second communicating end 1222. The first selector switch 12 is connected to the first transmitting end 111 and the first receiving end 112 through the first synchronizing end 1211 and the second synchronizing end 1221, respectively. The second transmitting end 1231 and the second receiving end 1232 are further connected to a first connecting port 131 and a second connecting port 132. The first connecting port 131 and the second connecting port 132 are configured to have connection with the communication interfaces as described below.

The two slave control circuits 20 include a first slave control circuit 201 and a second slave control circuit 202. The slave control circuits 20 have a second controller 21. In the present embodiment, the second controller 21 is a pulse width modulation controller. The second controller 21 further has a third transmitting end 211 and a third receiving end 212. The third transmitting end 211 and the third receiving end 212 are respectively connected to a second selector switch 22. The second selector switch 22 has a fourth transmitting end 2231 and a fourth receiving end 2232. The second selector switch 22 further has a third synchronizing end 2211, a fourth synchronizing end 2221, a third communicating end 2212, and a fourth communicating end 2222. Therein, the fourth transmitting end 2231 is selectively connected to either the third synchronizing end 2211 or the third communicating end 2212, and the fourth receiving end 2232 is selectively connected to either the fourth synchronizing end 2221 or the fourth communicating end 2222. The second selector switch 22 is connected to the third transmitting end 211 and the third receiving end 212 through the third synchronizing end 2211 and the fourth synchronizing end 2221, respectively. The fourth transmitting end 2231 and the fourth receiving end 2232 are further connected to a third connecting port 231 and a fourth connecting port 232, respectively. The third connecting port 231 and the fourth connecting port 232 are configured to have connection with the communication interfaces as described below.

The two communication interfaces 30 include a first communication interface 301 and a second communication interface 302. The first communication interface 301 spans between the first connecting port 131 of the master control circuit 10 and the fourth connecting port 232 of the first slave control circuit 201, thereby connecting the master control circuit 10 and the first slave control circuit 201 together. The second communication interface 302 has its one end connected to the third connecting port 231 of the first slave control circuit 201, and an opposite end connected to the fourth connecting port 232 of the second slave control circuit 202, thereby connecting the first slave control circuit 201 and the second slave control circuit 202. In the same manner, one slave control circuit is connected to the other slave control circuit through a communication interface, so that the slave control circuits 20 are connected in series, and the slave control circuits 20 are connected to the master control circuit 10 through the communication interfaces 30. In the present embodiment, the communication interface 30 is an RS-485 serial communication interface. However, this is one non-limiting embodiment of the present invention. In other embodiments, the communication interface 30 may be an RS-422 serial communication interface, an RS-232 serial communication interface or other serial communication interfaces.

Still referring to FIG. 1, in the synchronizing circuitry, the first communication interface 301 has one end inserted into the first connecting port 131 of the master control circuit 10, and the other end inserted into the fourth connecting port 232 of the first slave control circuit 201. The second communication interface 302 has one end inserted into the third connecting port 231 of the first slave control circuit 201, and the other end inserted into the fourth connecting port 232 of the second slave control circuit 202. When the first selector switch 12 is such set that the first synchronizing end 1211 is connected to the second transmitting end 1231, and the second synchronizing end 1221 is connected to the second receiving end 1232, while the second selector switch 22 is also such set that the third synchronizing end 2211 is connected to the fourth transmitting end 2231, and the fourth synchronizing end 2221 is connected to the fourth receiving end 2232, the communication interfaces 30 connect the master control circuit 10 and the slave control circuits 20 in series, so that the master control circuit 10 can send it control signal through the communication interfaces 30 to the slave control circuits 20, thereby making the slaves to act synchronously with the master. In other words, these communication interfaces allow the desired master-slave control among the master and the slaves. Furthermore, with the communication interfaces 30, the connection among the master control circuit 10 and the slave control circuits 20 can be established on the existing communication loops. When the master performs master-slave control on the slaves, the slaves have synchronous connection with the master, thereby significantly mitigating electromagnetic interference and noise during the master-slave control, and significantly improving the efficiency of signal transmission during the master-slave control. As a result, the master-slave control is more responsive.

Additionally, the communication interfaces allow the master control circuit 10 and the slave control circuits 20 to be connected with their existing communication loops, so the synchronizing circuitry is capable of performing other kind of signal transmission in addition to master-slave control, helping to minimize the interfaces and wiring required among the master and the slaves.

Figure 2:
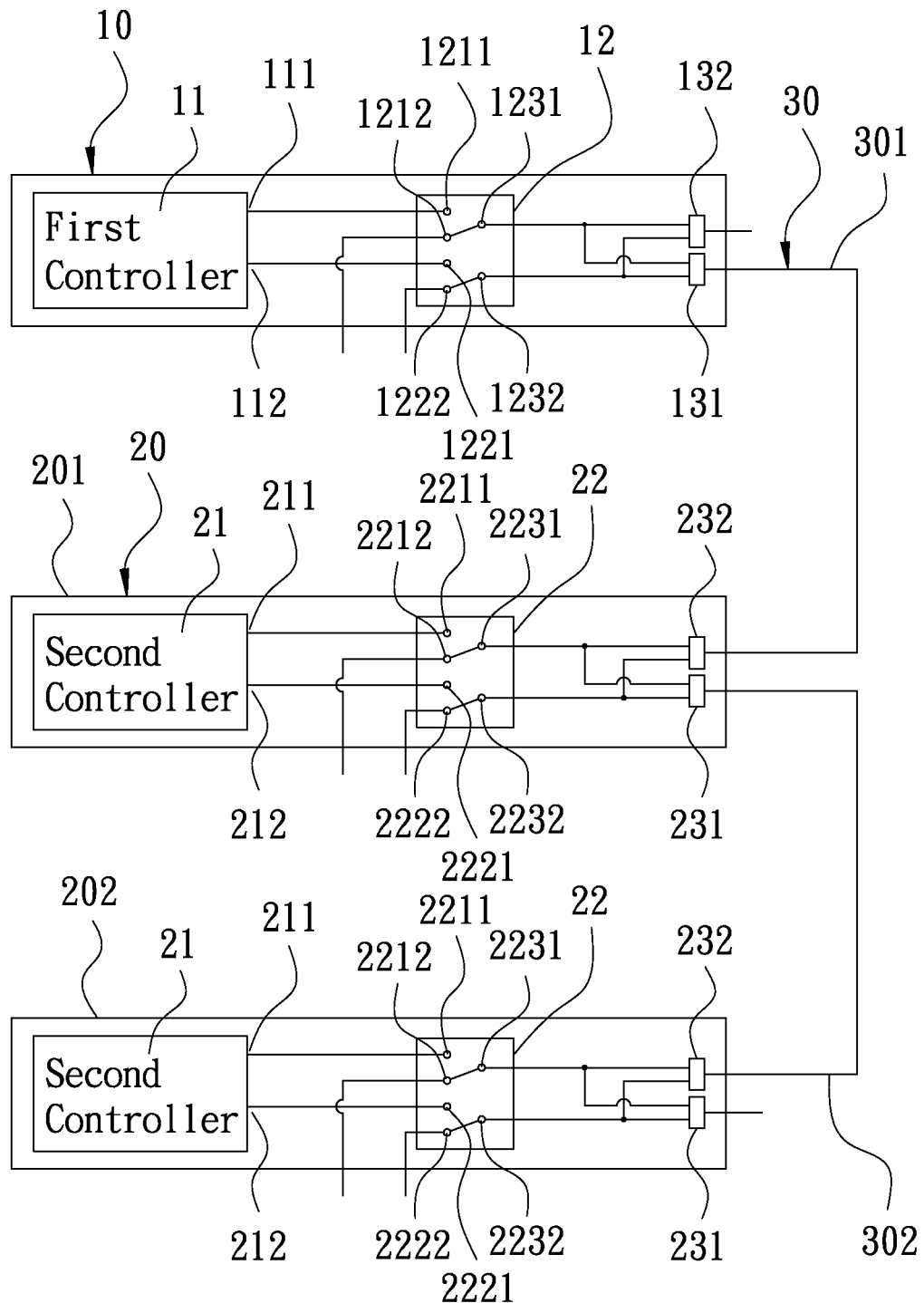
FIG. 2 is a block diagram illustrating the synchronizing circuitry not performing synchronous control.

Referring to FIG. 2, when the synchronizing circuitry is to be used for signal transmission, it can be easily prepared by such setting the first selector switch 12 and the second selector switch 22 that, in the first selector switch 12, the first communicating end 1212 is connected to the second transmitting end 1231, and the second communicating end 1222 is connected to the second receiving end 1232, and, in the second selector switch 22, the third communicating end 2212 is connected to the fourth transmitting end 2231, and the fourth communicating end 2222 is connected to the fourth receiving end 2232. In this state, the synchronizing circuitry can use the communication interfaces for signal transmission.

To sum up, the present invention has the following features and expected effects.

With the communication interfaces, the connection among the master control circuit and the slave control circuits can be established on the existing communication loops. When the master performs master-slave control on the slaves, the slaves have synchronous connection with the master, thereby significantly mitigating electromagnetic interference and noise during the master-slave control, and significantly improving the efficiency of signal transmission during the master-slave control. As a result, the master-slave control is more responsive.

What is claimed is:

1. A synchronizing circuitry for AC-DC switch mode power supplies, the synchronizing circuitry comprising:
    a master control circuit, having a first controller for controlling a switching frequency of a master power source, the first controller being connected to a first selector switch for selectively performing master-slave synchronous control, the first selector switch being further connected to a first connecting port and a second connecting port;
    at least one slave control circuit, having a second controller for controlling a switching frequency of a salve power source, the second controller being connected to a second selector switch for selectively performing master-slave synchronous control, the second selector switch being further connected to a third connecting port and a fourth connecting port;
    at least one communication interface, spanning between the first connecting port of the master control circuit and the fourth connecting port of the slave control circuit;
    whereby, as the communication interface connects the master control circuit and the slave control circuit, when the first selector switch and the second selector switch both select to perform master-slave control, the first controller works on the switching frequencies in the power supplies for synchronous control, and the master control circuit establishes synchronous connection with the slave control circuit, thereby achieving master-slave synchronous control.

2. The synchronizing circuitry of claim 1, wherein the first selector switch has a second transmitting end, a second receiving end, a first synchronizing end, a second synchronizing end, a first communicating end, and a second communicating end, in which the second transmitting end is selectively connected to either the first synchronizing end or the first communicating end, and the second receiving end is selectively connected to either the second synchronizing end or the second communicating end, the first controller having a first transmitting end and a first receiving end, the first transmitting end being connected to the first synchronizing end, the first receiving end being connected to the second synchronizing end, the second transmitting end being connected to the first connecting port, and the second receiving end being connected to the second connecting port.

3. The synchronizing circuitry of the AC-DC switch mode power supply of claim 1, wherein the second selector switch has a fourth transmitting end and a fourth receiving end, while the first selector switch further has a third synchronizing end, a fourth synchronizing end, a third communicating end, and a fourth communicating end, in which the fourth transmitting end is selectively connected to either the third synchronizing end or the third communicating end, and the fourth receiving end is selectively connected to either the fourth synchronizing end or the fourth communicating end, the first controller having a third transmitting end and a third receiving end, the third transmitting end being connected to the third synchronizing end, the third receiving end being connected to the fourth synchronizing end, the fourth transmitting end being connected to the third connecting port, and the fourth receiving end being connected to the fourth connecting port.

4. The synchronizing circuitry of the AC-DC switch mode power supply of claim 1, wherein the first controller is a pulse width modulation controller.

5. The synchronizing circuitry of the AC-DC switch mode power supply of claim 1, wherein the second controller is a pulse width modulation controller.

6. The synchronizing circuitry of the AC-DC switch mode power supply of claim 1, wherein the communication interface is a serial communication interface.

* * * * *